United States Patent [19]

Blaimschein

[11] Patent Number: 4,681,491
[45] Date of Patent: Jul. 21, 1987

[54] MILLING MACHINE

[75] Inventor: Gottfried Blaimschein, Steyr, Austria

[73] Assignee: GFM Gesellschaft, Steyr, Austria

[21] Appl. No.: 662,352

[22] Filed: Oct. 18, 1984

[30] Foreign Application Priority Data

Nov. 15, 1983 [EP] European Pat. Off. ......... 83890211.2

[51] Int. Cl.[4] ............................................... B23C 3/06
[52] U.S. Cl. ................................ 409/200; 51/105 SP; 82/9
[58] Field of Search ...................... 409/199, 200, 203; 82/9, 20; 51/105 SP; 29/6

[56] References Cited

U.S. PATENT DOCUMENTS

| 4,110,055 | 8/1978 | Blaimschein et al. | 409/199 X |
| 4,208,156 | 6/1980 | Kralowetz et al. | 409/200 X |
| 4,326,323 | 4/1982 | Kralowetz et al. | 409/200 X |
| 4,337,011 | 6/1982 | Schmid | 409/199 |

*Primary Examiner*—Z. R. Bilinsky
*Attorney, Agent, or Firm*—Kurt Kelman

[57] ABSTRACT

The milling machine comprises milling units which are adapted to perform a movement for a machining of workpieces to form cross-sections which are concentric or eccentric to the axis of the workpiece. Each milling unit comprises a rotatable tool drum, which accommodates an internally cutting annular inserted-tooth cutter and is connected to means for rotating the tool drum. The workpiece is gripped at its ends and is also supported by back rests between the milling units. In order to provide a relatively simple machine and to minimize the machining times, the milling units are mounted on a common milling slide, which is adapted to impart the feed movement to the milling units, and a free space for receiving a back rest during said feed movement is defined between adjacent milling units. The milling units are rotatably mounted in bearing brackets, which are mounted on the milling slide and define said free space. Said bearing brackets may be adjustable relative to each other and may be axially forced toward each other and against interposed spacers.

12 Claims, 9 Drawing Figures

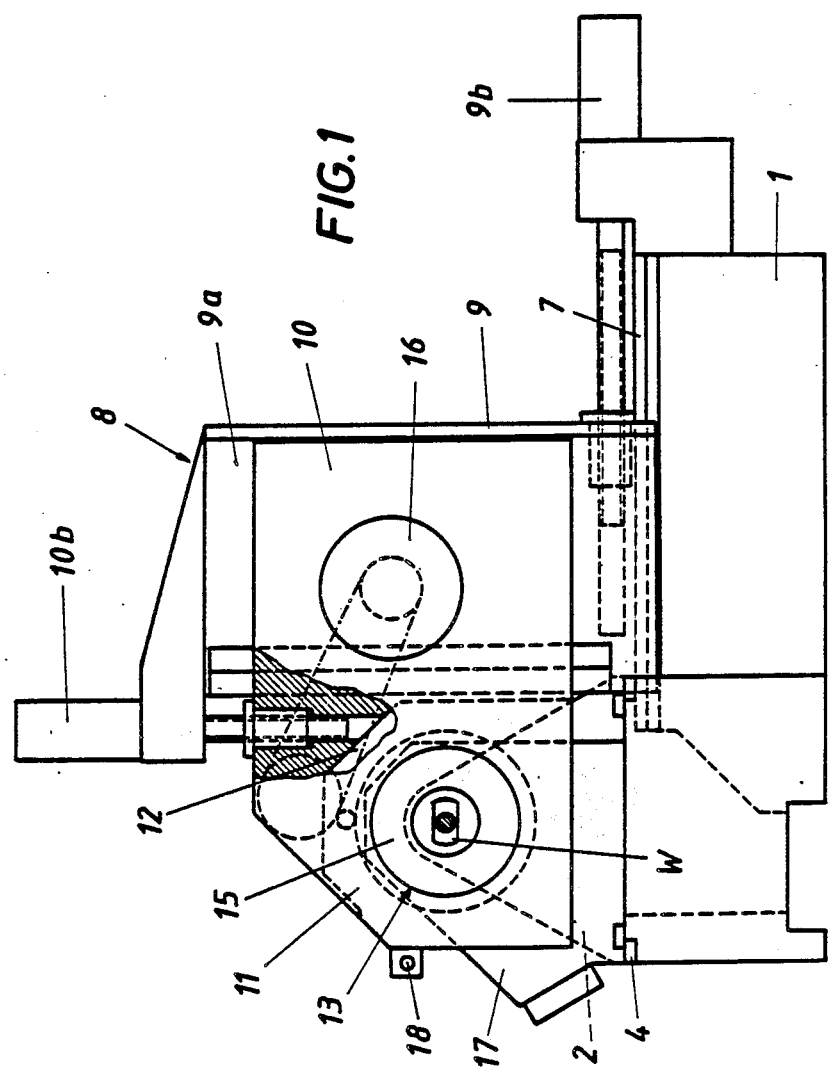

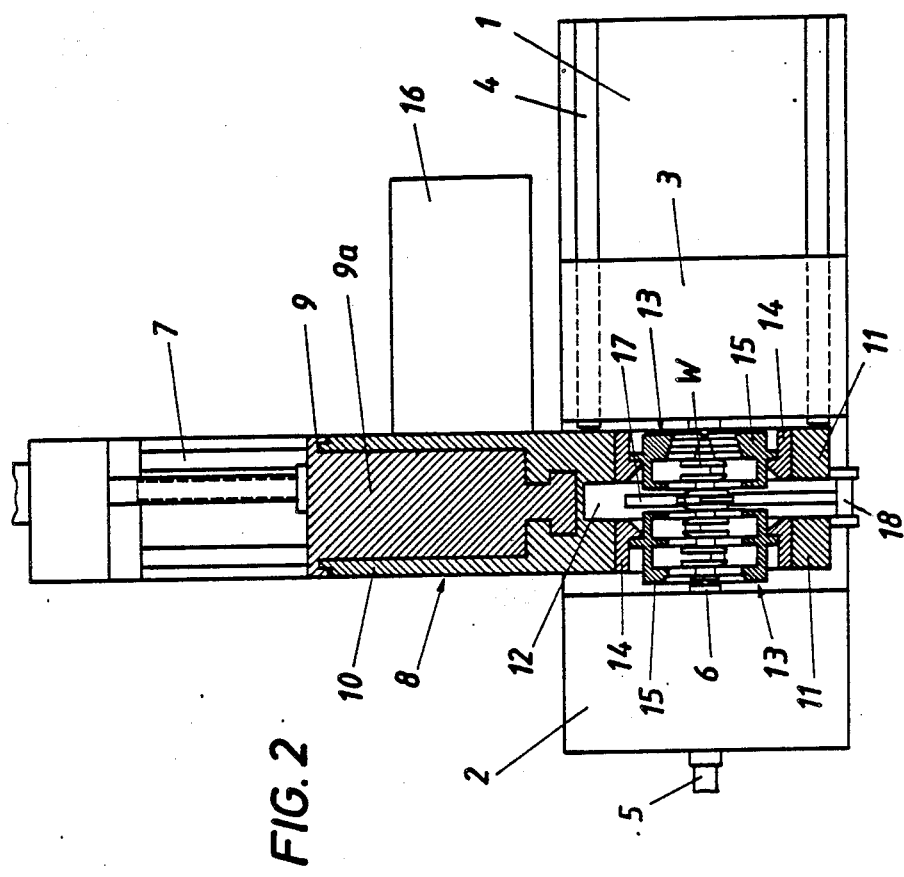

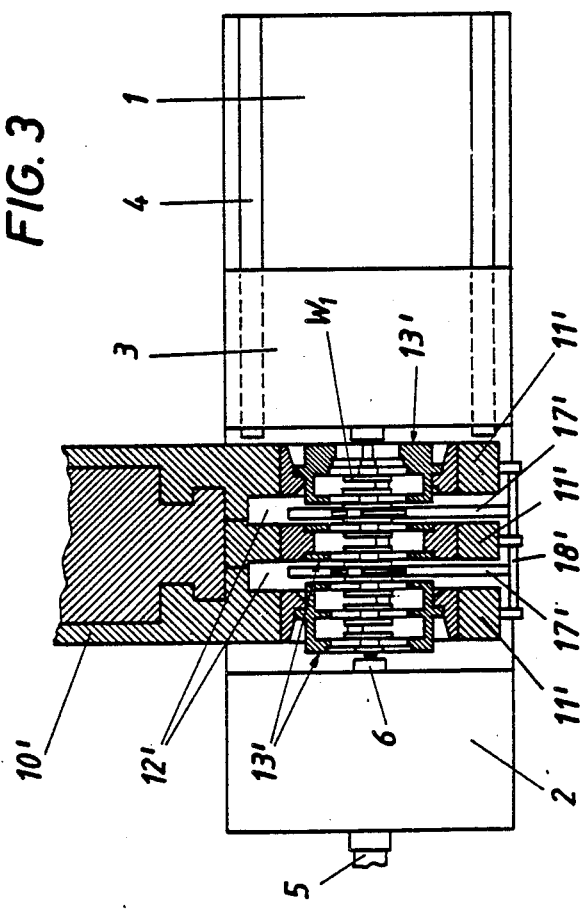

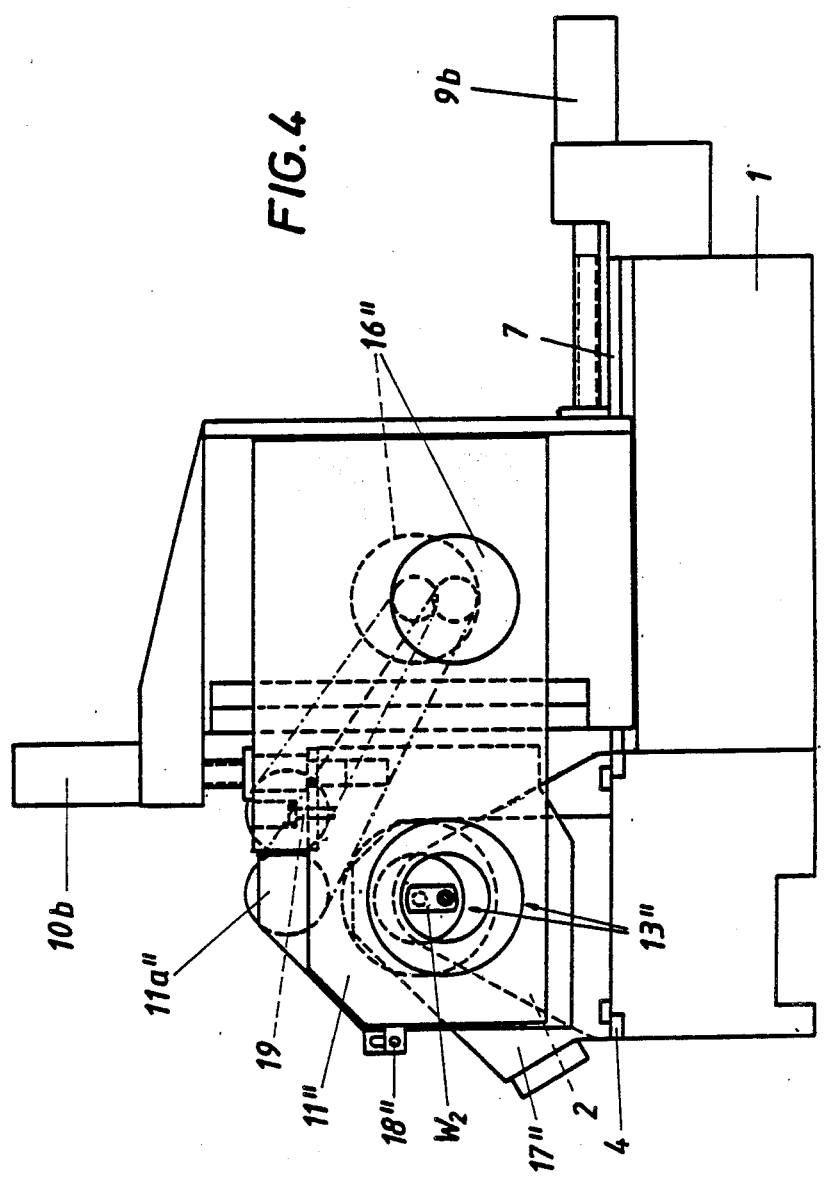

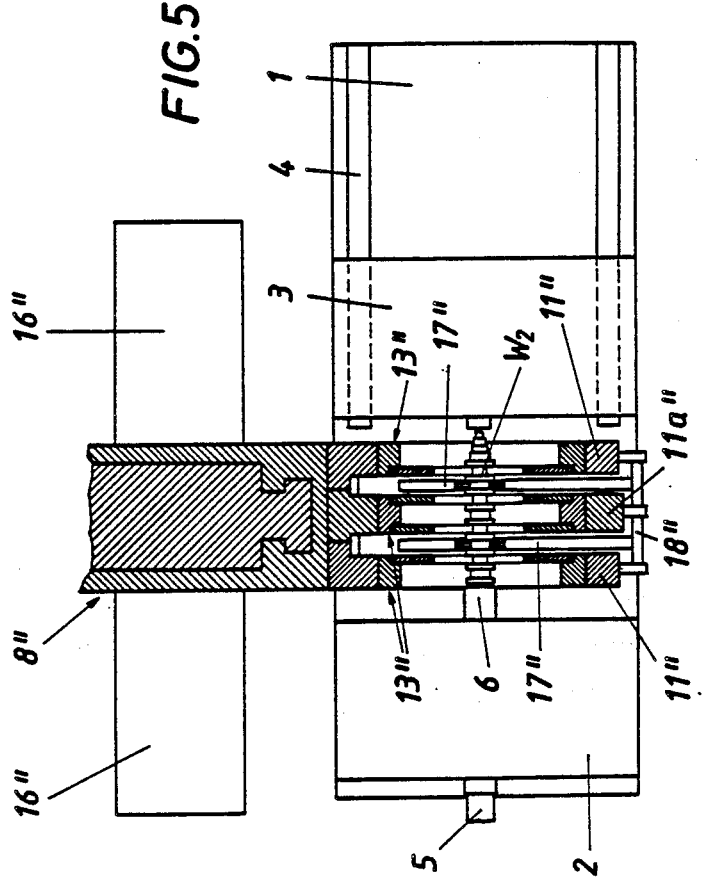

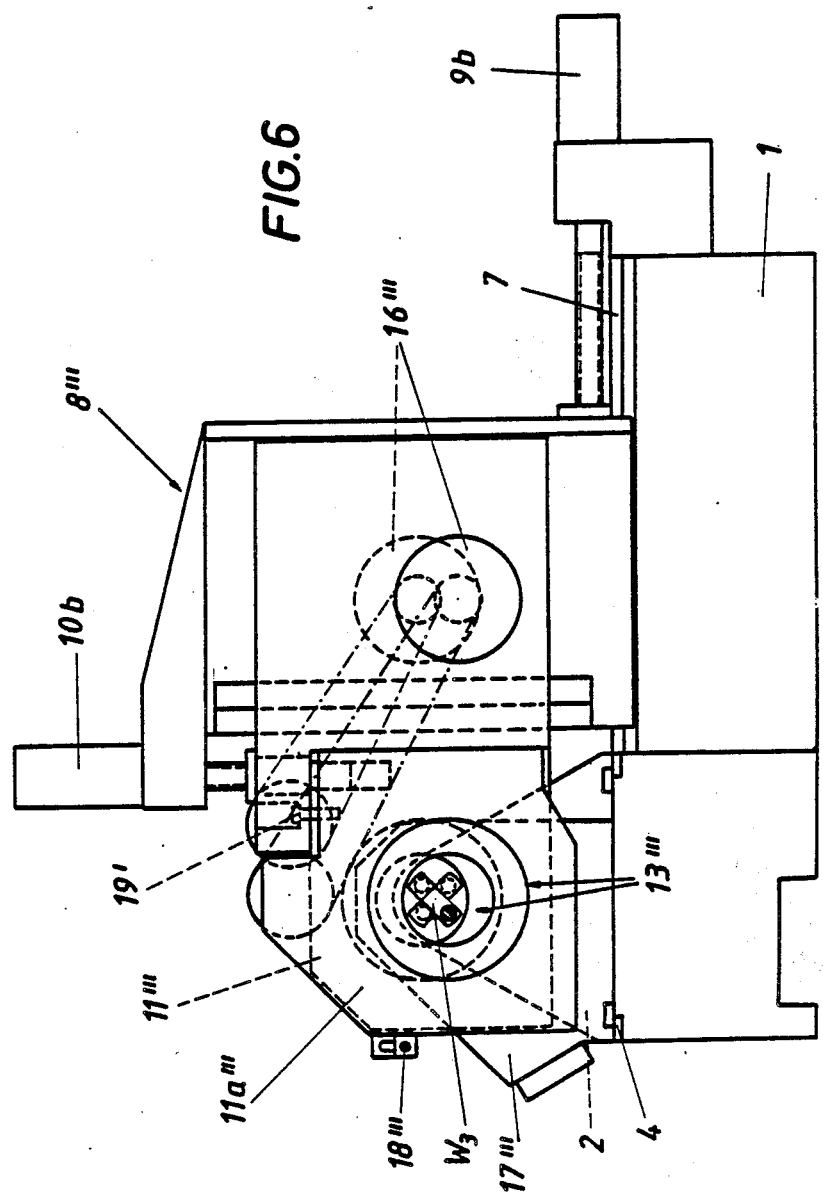

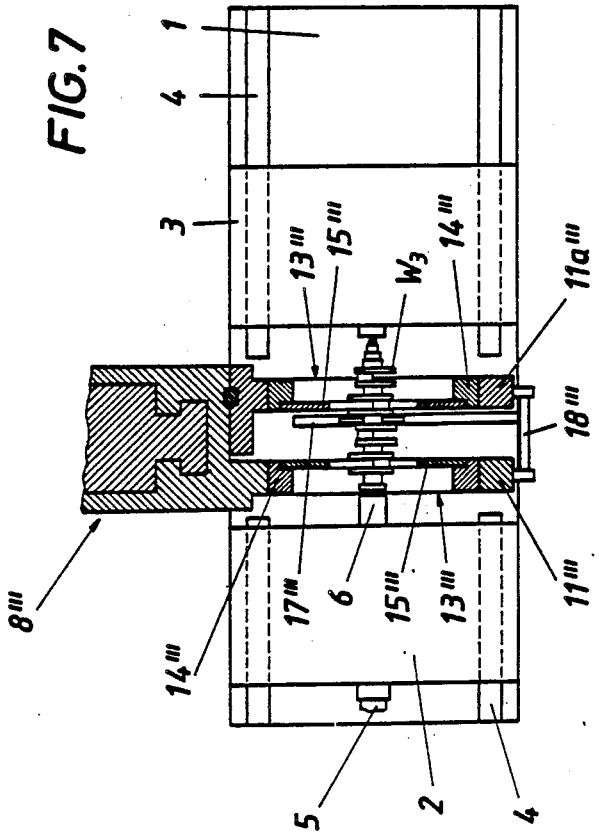

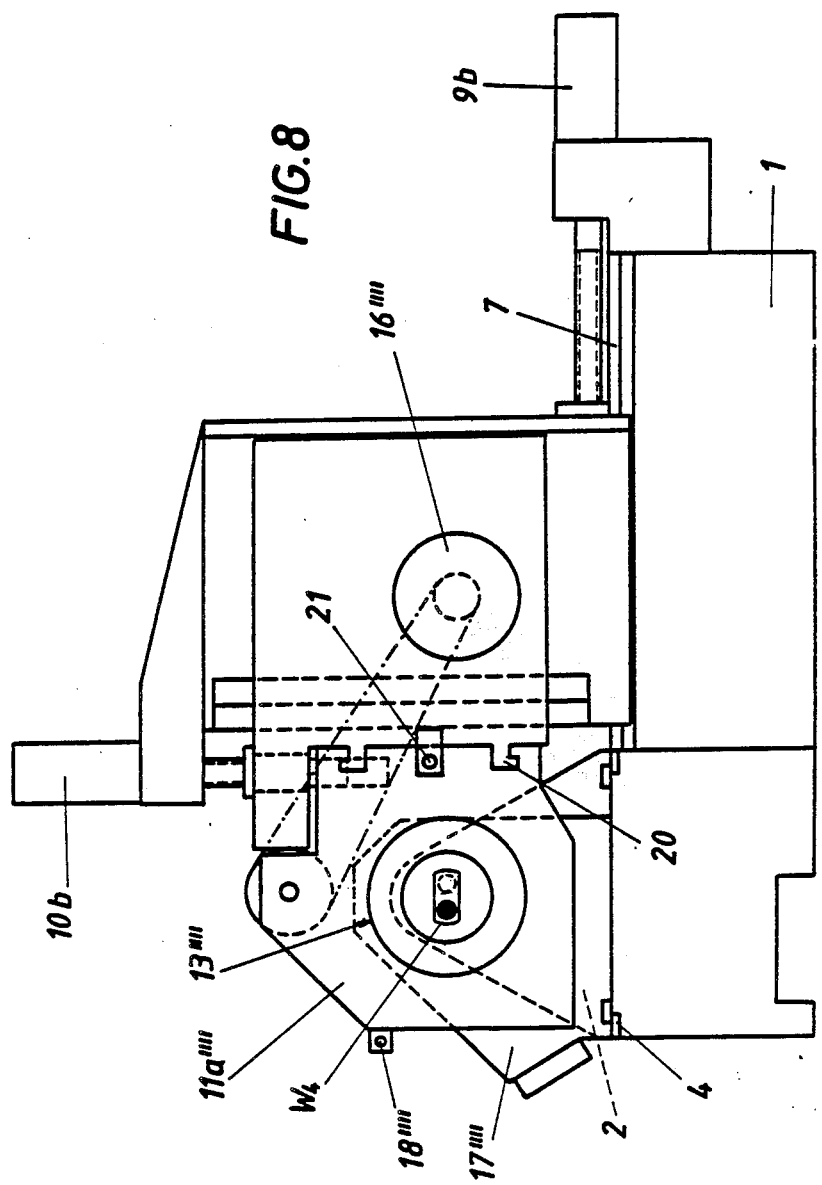

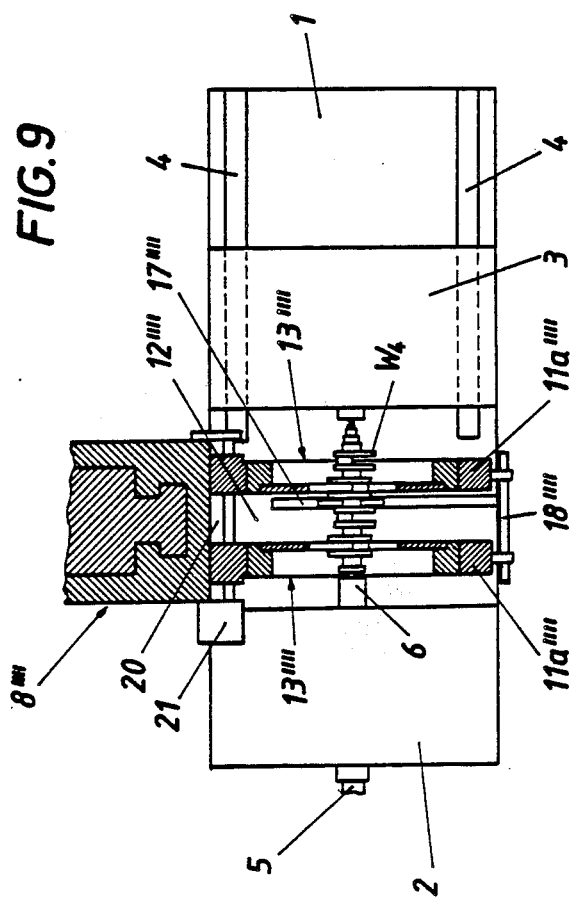

MILLING MACHINE

BACKGROUND OF THE INVENTION

1. Field of the Invention

This invention relates to a milling machine for machining crankshafts and similar workpieces, comprising milling units adapted to perform a feeding movement in a plane that is normal to the axis of the workpiece for machining the workpiece to form circular cross-sections which are concentric or eccentric to the axis of the workpiece, and a back rest for supporting the workpiece between the milling units in addition to the support of the workpiece at its ends, each of which milling units comprising a tool drum, adapted to be driven and to accommodate internally cutting annular inserted-tooth cutters.

2. Description of the Prior Art

Milling machines comprising two milling units and single or multiple inserted-tooth cutters as milling tools are used in the mass production of crankshafts or camshafts and similar workpieces and permit the workpieces to be machined within a short time because a plurality of cross-sections are machined at the same time. But in that case the workpiece is rather unstable and a machining to the desired accuracy will not be possible unless the workpiece which is gripped at its ends is additionally supported between its ends. Such an intermediate support of the workpiece gives rise to difficulties in internal milling operations, which are preferable to external milling operations because the edge life is longer and a better finish is obtained. But in internal milling operations the tool drums which surround the workpiece prevent the use of a back rest for supporting the workpiece between its ends. When it is desired to machine, e.g., all mainshaft portions or all crankpins of a crankshaft without a regripping of the workpiece, it has previously been necessary to provide for each milling unit a separate milling slide, which is mounted on an axially movable carriage, and to provide space for a back rest between the slides. In that case it is not possible to machine all mainshaft portions or crankpins at the same time but the machining must be performed in a plurality of steps, between which the milling units are longitudinally displaced. Besides, the slides required for the respective milling units must be provided with driving and control means operative in the direction of five or six coordinate axes, depending on whether the workpiece rotates or is at a standstill, and the axial displacement of the milling units involves a considerable increase of the nonproductive times so that the total machining time is increased; this is most undesirable.

In an attempt to utilize the advantages of internal milling in conjunction with short machining times, it has already been proposed in accordance with Laid-open German Application No. 31 17 030 to provide a milling machine with two machining stations, to machine one part of the crankshaft in one machining station and to machine the remainder of that crankshaft in the other machining station with a suitable time delay. In that case two crankshafts can be machined at the same time and each workpiece can be machined in each station at a plurality of cross-sections without a need for an axial displacement of the milling unit employed, and can be supported at the remaining portions, which are not machined at a given time, in addition to the gripping of the workpiece at its ends. But this concept involves high construction costs and requires each workpiece to be released in one station and regripped in the other station so that the nonproductive time is also increased. In addition the workpiece may be regripped in an eccentric position so that the machining may be inaccurate.

SUMMARY OF THE INVENTION

It is an object of the invention to eliminate these disadvantages and to provide a crankshaft milling machine which is of the kind described first hereinbefore but has a comparatively simple overall concept and permits the machining times to be minimized.

This object is accomplished in accordance with the invention by mounting at least two and preferably all milling units on a common milling slide, which is adapted to perform the feed movement, while leaving a free space for a back rest between adjacent milling units. Whereas the milling units mounted on a common milling slide can no longer be used independently of each other but will always perform the same feed movement, the fact that the same drive means and control means are associated with all milling units substantially improves the economy of the machine. Particularly in the mass production of crankshafts and similar workpieces, the workpieces to be machined are always identical so that the milling units are used in any case in the same relation to each other and the fact that they cannot be operated independently of each other is no disadvantage. On the contrary, the nonproductive times will be greatly shortened because the milling units need not be displaced after each machining step. The free space formed by a recess in the common milling slide between the adjacent milling units permits a mounting of a back rest for supporting the workpiece intermediate its ends so that the workpiece can be machined in a single gripped position at all cross-sections at which the workpiece can be machined by means of milling units or inserted-tooth cutters which perform the same feed movements. It is apparent that the milling machine is simple in structure and its milling slide is associated with driving and control means acting in the direction of only two rather than five or six coordinate axes and can be used for the simultaneous machining of crankshafts at all mainshaft portions and end flanges by means of tool drums which are coaxial to each other and carry suitable inserted-tooth cutters. For a machining of crankpins or other eccentric cross-sections the tool drums may be so disposed that their axes are offset from each other. In that case the milling slide will consist of a compound slide and the position of the drum axes relative to each other must be in accordance with the center spacing and angular position of the cross-sections which are to be machined and which are to be aligned with the milling units. In that case too, the drive and control means need to act only in the directions of two coordinate axes and nevertheless all crankpins can be machined at the same time.

In accordance with a preferred further feature of the invention, the milling units are mounted on the milling slide so as to be adjustable relative to each other. In that case one and the same milling machine may be used in an advantageous manner to machine workpieces which differ in dimensions and design. In dependence on the field of application of the machine, the adjustment may be provided in an axial, vertical or horizontal direction, and a combined adjustment may be provided where a universal application is desired. In that case the milling units can be adjusted in view of different eccentricities, center spacings and angular misalignments.

A simple and compact structure will be obtained if, in accordance with the invention, the milling slide carries a separate bearing bracket for each milling unit and said bearing brackets are axially spaced apart and protrude freely from that side of the slide which faces the workpiece. Such bearing brackets provide a stable support for each milling unit and there is adequate space for the back rests between the bearing brackets.

If the bearing brackets are mounted on a milling slide which consists of a compound slide, the workpiece must be rotated as it is machined and the machining operations which can be performed are restricted. In one embodiment of the invention the milling slide consists of a cross-slide and a vertically movable lifting slide, which surrounds a guide column of the cross slide and carries the bearing brackets for mounting the milling units. In that case the cross slide and the lifting slide constitute, in combination, a simple compound slide which may be used to impart a revolving feed movement to the milling units so that the workpiece need not be driven as it is machined at its crankpins and mainshaft portions.

At least one of the bearing brackets may consist of a mounting slide, which is adjustable relative to the lifting slide. In that case the desired movement of the milling units relative to each other and relative to the milling slide can be imparted to the milling units without need for an additional structural expenditure.

In order to avoid vibration and to ensure a stable guidance of the tools, it is within the scope of the invention to axially force the protruding portions of the bearing brackets toward each other and against interposed spacers.

BRIEF DESCRIPTION OF THE DRAWING

FIGS. 1 and 2 are, respectively, an end elevation, in which the front gripping head has been omitted, and a top plan view, partly in section, showing a first illustrative embodiment of a milling machine in accordance with the invention.

FIG. 3 is a top plan view showing, partly in section, a milling machine which is slightly modified from the first embodiment.

FIGS. 4 and 5 are, respectively, an end elevation, in which the front gripping head has been omitted, and a top plan view, partly in section, showing a second illustrative embodiment of a milling machine in accordance with the invention.

FIGS. 6 and 7 are respectively, an end elevation, in which the front gripping head has been omitted, and a top plan view, partly in section, showing a third illustrative embodiment of a milling machine in accordance with the invention, FIGS. 8 and 9 are, respectively, an end elevation, in which the front gripping head has been omitted, and a top plan view, partly in section, showing fourth illustrative embodiment of a milling machine in accordance with the invention.

DESCRIPTION OF THE PREFERRED EMBODIMENTS

The invention is diagrammatically illustrated in the drawing.

Two gripping heads 2, 3 are mounted on a machine bed 1. At least one gripping head 3 is slidably mounted on longitudinal rails 4 carried by the machine bed 1. The other gripping head 2 comprises a spindle sleeve 6, which is extensible by means of a hydraulic actuator 5 so that coordinated movements may be imparted to the gripping head 3 and the spindle sleeve 6, and the workpieces to be machined, which are gripped by the gripping heads 2 and 3, can be axially replaced. Said movements permit a replacement in the axial direction of the workpieces to be machined, which are gripped by the gripping heads 2 and 3. A milling slide 8 is guided on transverse rails 7, which are carried by the machine bed 1 and extend normal to the axis of the workpiece. That milling slide consists of a cross slide 9 having a guide column 9a and a vertically movable lifting slide 10, which surrounds the guide column 9a. The cross slide 9 and the lifting slide 10 are displaceable independently of each other by respective power screws 9b, 10b. As a result, any desired feed movement in a plane which is normal to the axis of the workpiece can be performed by the milling slide 8.

In the embodiment shown in FIGS. 1 and 2, the lifting slide 10 carries two freely protruding bearing brackets 11, which define a free space 12 between them. Two milling units 13, which are coaxial to each other, are mounted in respective ones of the bearing brackets 11. Each milling unit 13 consists of a tool drum 14, which is rotatably mounted in the bearing bracket 11, and an internally cutting, multiple inserted-tooth cutter 15. Rotation is imparted to both milling units 13 by a common motor 16 via transmission and synchronizing means, which are only diagrammatically indicated. In this manner all mainshaft portions and the end portions of a crankshaft having four crankpins can be machined at the same time. During that operation, the crankshaft is gripped at its ends by the gripping heads 2, 3 and is additionally supported by a back rest 17, which is disposed in the free space 12 between the two bearing brackets 11 and may be used to grip the crankshaft W between the two milling units 13. Besides, the two bearing brackets 11 are axially forced toward each other against a spacer 18 in order to avoid vibrations so that a machining to a high accuracy can be performed. Because the two milling units 13 are mounted on the common milling slide 8, they can be operated by uniform controlling and drive means, which act only in the directions of two coordinate axes. The machining times are very short because all mainshaft portions can be machined at the same time.

If three bearing brackets 11' rather than two bearing brackets are provided, as is shown in FIG. 3, and the tool drum of a milling unit 13' is rotatably mounted in each of said bearing brackets 11', and free spaces 12' are left between adjacent bearing brackets 11', then it will be possible to machine all mainshaft portions of a crankshaft $W_1$ having six crankpins at the same time. Said three bearing brackets 11' are also axially forced toward each other and against interposed spacers 18', and the crankshaft $W_1$ can be supported by back rests 17', which are disposed between adjacent milling units 13'. If the bearing brackets 11' are not integral with the lifting slides 10' of the milling slide 8' but the slide and the bearing brackets are composed of separate components, then a milling slide may be provided with any of a plurality of bearing brackets for mounting different milling units. Regardless of the bearing brackets which are provided, the workpiece is always replaced in an axial direction. For a replacement of the inserted-tooth cutter, the milling slide must be retracted along the transverse rails until the inserted-tooth cutters are laterally accessible.

The milling machine shown in FIGS. 4 and 5 comprises a milling slide 8'', which carries three bearing brackets 11'' and 11a'' for mounting three milling units 13''. In this case the intermediate bearing bracket 11a' constitutes a mounting slide, which is vertically adjustable relative to the two other bearing brackets 11'' by means of positioning drive 19. In this manner the milling units 13'' can be offset relative to each other and the crankpins of a crankshaft $W_2$ having four crankpins extending in a common plane can be machined at the same time. In that case the axis of the intermediate milling unit must be offset by twice the crank throw of the crankshaft from the axis of the two end milling units. For this purpose the intermediate bearing bracket 11a'' is adjusted by means of the positioning drive 19. The crankshaft $W_2$ must be gripped in such a manner that the axes of the crankpins are vertically aligned. As the milling units 13'' of this milling machine are offset from each other, two motors 16'' are provided, one of which drives the intermediate milling unit 13'' and is adjustable with the unit 13'' and the other of which drives the end milling units 13''. As a result, the milling units can be adjusted without difficulty. Two back rests 17'' for supporting the crankshaft $W_2$ are provided in the free spaces 12'' left between the bearing bracket 11a'' and the bearing brackets 11''. When the intermediate bearing bracket 11a'' has been adjusted, the bearing brackets can be axially forced toward each other and against suitable spacers 18''.

The milling machine shown in FIGS. 6 and 7 may be used to machine the crankpins of a crankshaft $W_3$ having four angularly spaced apart crankpins, two of which can be machined at the same time. For this purpose the milling slide 8''' carries a fixed bearing bracket 11''' and a bearing bracket 11a''', which constitutes a vertically displaceable mounting slide. The crankshaft $W_3$ to be machined is gripped in such a manner that the axes of two crankpins are vertically aligned. By means of the positioning drive 19', the two milling units 13''' are adjusted to a center spacing which is equal to the center spacing of said two crankpins. Because a pair of crankpins is to be machined at the same time, the tool drum 14''' of each milling unit 13''' is provided only with a single inserted-tooth cutter 15''' and the center spacing of the two inserted-tooth cutters 15''' equals the center spacing of the two crankpins to be machined at the same time. For machining the two crankpins at the same time, a uniform feed movement is imparted to the milling units 13''' by the milling slide. The adjustment of the milling units 13''' can easily be accomplished because a separate motor 16''' is provided for each milling unit and is adjustable therewith. A machining to a high finish is also ensured in this case by the provision of a back rest 17''' between the bearing brackets 11''', 11a'''. The two bearing brackets are axially forced toward each other and against the spacer 18'''. When one pair of crankpins has been machined, the crankshaft $W_3$ must be repositioned. This can easily be accomplished after the two gripping heads 2, 3 have been shifted.

In the embodiment shown in FIGS. 8 and 9, a milling slide 8'''' is provided with two bearing brackets which constitute mounting slides 11'''' that are axially displaceable along horizontal rails 20 and the axial spacing of said bearing brackets may be adjustable by means of a positioning drive 21. Such a machine may be used to machine any desired crankshaft $W_4$ at a pair of corresponding crankpins at the same time without a need for adjusting the position of the milling slide 8'''' or of the workpiece $W_4$ because the milling units 13'''' can be adjusted by the adjustment of the bearing brackets 11a''''. In this case a free space 12'''' for accommodating a back rest 17'''' is also left between the bearing brackets and the bearing brackets can easily be axially forced toward each other and against interposed spacers 18'''' which are adjustable in length.

The milling machine in accordance with the invention is particularly suitable for the mass production of crankshafts and camshafts and is distinguished by an economical operation and by relatively low construction costs. Besides, it is highly versatile as regards the workpiece to be machined and the machining programs to be performed.

In all embodiments described hereinbefore, the bearing brackets constitute means which are provided on the milling slide and define between adjacent milling units a free space for receiving the back rest during the feed movement imparted to the milling units by the milling slide.

I claim:

1. A milling machine comprising a plurality of internally cutting inserted-tooth cutters for machining an elongate workpiece to form a plurality of axially spaced portions which are circular in cross section, which comprises
   (a) a machine bed;
   (b) spaced apart gripping means mounted on the machine bed and adapted to grip the elongate workpiece at both ends thereof with the axis of the workpiece in a predetermined position;
   (c) two milling units spaced apart along the workpiece axis, each milling unit being movable in a plane normal to the axis of the gripped workpiece and adapted to perform a feed movement in said plane for the machining of the workpiece, each milling unit comprising
      (1) a rotatably mounted tool drum holding at least one of said inserted-tooth cutters inside the drum;
   (d) drive means for rotating the tool drums;
   (e) feed drive means for imparting said feed movement to the milling units, the feed drive means comprising
      (1) a common milling slide mounted on the machine bed, the milling units being mounted on the common milling slide, and the milling slide including means defining a free space between the milling units, and
   (f) a back rest mounted on the machine bed between the milling units and received in the free space during the feed movement, the back rest supporting the gripped workpiece.

2. The milling machine of claim 1, comprising more than two of said milling units mounted on the common milling slide, the means on the milling slide defining respective ones of the free spaces between adjacent ones of the milling units and respective ones of said back rests being mounted on the machine bed between the adjacent milling units and received in the respective free spaces.

3. The milling machine of claim 2, wherein the means on the milling slide comprises a plurality of axially spaced bearing brackets mounted on the milling slide and protruding therefrom towards the gripped workpiece to define the free spaces, the tool drums of the milling units being rotatably mounted on the bearing brackets.

4. The milling machine of claim 3, wherein the milling slide comprises a cross slide and a lifting slide, the cross slide being movable perpendicularly to the workpiece axis and comprising a vertical guide column, the lifting slide surrounding the guide column and being movable therealong, and the bearing brackets being carried by the lifting slide.

5. The milling machine of claim 4, wherein at least one of the bearing brackets constitutes a mounting slide adjustable relative to the lifting slide.

6. The milling machine of claim 3, further comprising spacers between adjacent ones of the protruding bearing brackets and means for axially forcing the protruding bearing brackets towards each other and towards the spacers disposed therebetween.

7. The milling machine of claim 1, wherein the milling units are mounted on the common milling slide for adjustment relative to each other.

8. The milling machine of claim 7, wherein the drum drive means comprises two motors, each of the motors being adjustable in unison with a respective one of the milling units and being operativelay connected to the tool drum thereof.

9. The milling machine of claim 1, wherein the means on the milling slide comprises two axially spaced bearing brackets mounted on the milling slide and protruding therefrom towards the gripped workpiece to define the free space, the tool drums of the milling units being rotatably mounted on the bearing brackets.

10. The milling machine of claim 9, wherein the milling slide comprises a cross slide and a lifting slide, the cross slide being movable perpendicularly to the workpiece axis and comprising a vertical guide column, the lifting slide surrounding the guide column and being movable therealong, and the bearing brackets being carried by the lifting slide.

11. The milling machine of claim 10, wherein one of the bearing brackets constitutes a mounting slide adjustable relative to the liftine slide.

12. The milling machine of claim 9, further comprising a spacer between the protruding bearing brackets and means for axially forcing the protruding bearing brackets towards each other and towards the spacer disposed therebetween.

* * * * *

UNITED STATES PATENT AND TRADEMARK OFFICE
CERTIFICATE OF CORRECTION

PATENT NO. : 4,681,491
DATED : July 21, 1987
INVENTOR(S) : GOTTFRIED BLAIMSCHEIN It is certified that error appears in the above-identified patent and that said Letters Patent is hereby corrected as shown below:

```
Cover page, item [73], assignee's name should be --GFM
Gesellschaft fur Fertigungstechnik und Maschinenbau
Gesellschaft m.b.H.--
```

Signed and Sealed this

Twelfth Day of July, 1988

Attest:

DONALD J. QUIGG

Attesting Officer

Commissioner of Patents and Trademarks